July 15, 1958 H. F. LIVERS 2,843,373
OUT OF ROUND ATTACHMENT
Filed Jan. 9, 1957

INVENTOR.
Harold F. Livers
BY
ATTORNEY

# United States Patent Office 2,843,373
Patented July 15, 1958

2,843,373
OUT OF ROUND ATTACHMENT

Harold F. Livers, Kansas City, Mo., assignor to Mary Catherine Harter, Tulsa, Okla.

Application January 9, 1957, Serial No. 633,348

2 Claims. (Cl. 266—23)

This invention relates to improvements in pipe cutting apparatus and more particularly, but not by way of limitation, to an out of round attachment for cutting imperfect pipe, and the like.

It is common practice today in the cutting and beveling of pipe to move a cutting torch circumferentially around the pipe. In imperfect pipe wherein the outer periphery is distorted and not a substantially true annulus, the cutting torch moving around the pipe is often unable to efficiently cut the pipe in a smooth manner. The cut of the distorted pipe will often be jagged, and provided with an uneven bevel. In order to overcome these disadvantages, out of round attachments for pipe cutting machines have been developed to compensate for the imperfections of the roundness of the outer periphery of the pipe. The out of round devices usually comprise a roller wheel secured in alignment with the cutting torch and adapted to roll on the outer periphery of the pipe for indicating imperfections in the pipe circumference. The roller wheel is secured to the torch in such a manner as to respond to distortions in the pipe for raising and lowering the torch to maintain the cutting implement an equal distance from the outer periphery of the pipe at all times.

The torch and indicating wheel are usually mounted on a bracket which is off-set in such a manner that the wheel and torch are disposed to one side of the longitudinal axis of the pipe, thus placing the cutting torch in a position off-set from the bracket arm carrying the torch, and which is usually centered relative to the pipe diameter. Consequently, if the wheel is moved by a distortion in the pipe periphery, the cutting torch is moved simultaneously, thereby changing the angle of the cutting torch with respect to the pipe and the cut being made on the pipe. The change in the angular disposition of the torch due to an out of round condition usually results in a jagged or curved cut with an uneven bevel instead of a straight bevelled cut around the pipe as desired. As by way of explanation, when the torch is disposed in the old off-set arrangement, and at a certain angle with respect to the pipe, such as thirty degrees, an upward movement of the guide roller will simultaneously move the cutting torch upward and change the angle of the cutting torch to something other than thirty degrees, depending upon the amount of movement of the roller and torch due to the out of roundness of the pipe. It will be apparent that this alteration of the angular disposition of the cutting torch will effect the angle of the bevelled edge being cut by the torch. This is very detrimental to the cutting of the pipe in that a substantially straight bevelled edge is difficult to obtain.

The present invention contemplates an improved out of round attachment for a cutting torch wherein the guide roller and torch are attached by a bracket to the torch arm which in turn is secured to the ring gear of the cutting machine such as that disclosed in the patent to C. A. Mathey et al., No. 1,998,729, issued April 23, 1935. The wheel or indicating roller rod and the torch clamp are centrally disposed between spaced arms of the torch bracket arm carried by the cutting machine, thereby positioning the roller and torch in alignment with the diameter of the pipe being cut instead of in the off-set position often found with present day out of round attachments. In other words, the roller member and torch are centered or in substantial alignment with the longitudinal axis of the pipe instead of off-set therefrom as in the present day out of round attachments. The roller member rides circumferentially around the outer periphery of the pipe and is adapted to alter position in response to deformations of the pipe in a manner whereby the cutting torch is maintained at an equal distance and constant angular disposition with respect to the pipe at all times during the cutting operation. Thus, it is possible to maintain a straight cut with a true bevel around the circumference of the pipe. By way of example, if the cutting torch is disposed at an angle of thirty degrees to the pipe, the torch will be maintained at the same angle with respect to the pipe regardless of the vertical height or depth of the out of round distortion on the periphery of the pipe.

It is an important object of this invention to provide an out of round attachment for a cutting torch whereby a substantially straight and true bevelled cut may be made around the circumference of the pipe.

It is another object of this invention to provide an out of round attachment for a pipe cutting torch wherein an indicating roller member constantly bears against the outer periphery of the pipe to maintain the cutting torch at substantially the same distance from the periphery of the pipe at all times during the cutting operation.

It is another object of this invention to provide a novel out of round attachment for a pipe beveling machine wherein the cutting torch is maintained at substantially the same angular disposition with respect to the pipe at all times during the cutting operation.

It is still another object of this invention to provide an out of round attachment for a pipe beveling machine wherein the indicating roller member bearing against the outer periphery of the pipe responds to distortions thereon for maintaining the cutting torch in an efficient cutting position wherein there is no binding during the reciprocal movement of the torch.

It is a further object of this invention to provide a novel out of round attachment for a pipe beveling machine which is simple and economical in construction and efficient and durable in operation.

Other objects and advantages of the invention will be evident from the following detailed description, read in conjunction with the accompanying drawings, which illustrate my invention.

Figure 1:
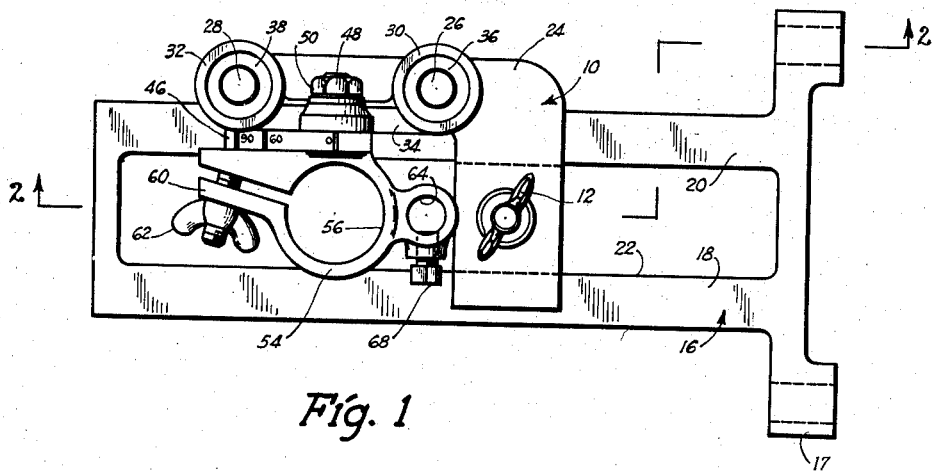
Figure 1 is a plan view of an out of round attachment embodying the invention.

Referring to the drawings in detail, reference character 10 indicates in general an out of round attachment for a pipe beveling machine (not shown). The out of round attachment 10 is suitably adjustably secured to a torch bracket or arm member 16 by means of a wing nut 12 and a cooperating plate member 14. The torch arm member 16 is provided with apertured ears 17 for bolting, or the like, to a pipe beveling machine in any well known manner. The torch arm bracket member 16 comprises a pair of spaced arms 18 and 20 providing an elongated slot 22 therebetween. When the bracket member 16 is secured to the pipe beveling machine, the arms 18 and 20 extend substantially parallel to the longitudinal axis of the pipe 23 being cut. Thus, the slot 22 is centered with respect to the axis of the pipe. The adjustable connection between the bracket member 16 and the out of round attachment 10 permits positioning of the attachment 10 longitudinally with respect to the bracket 16, as desired.

Figure 2:
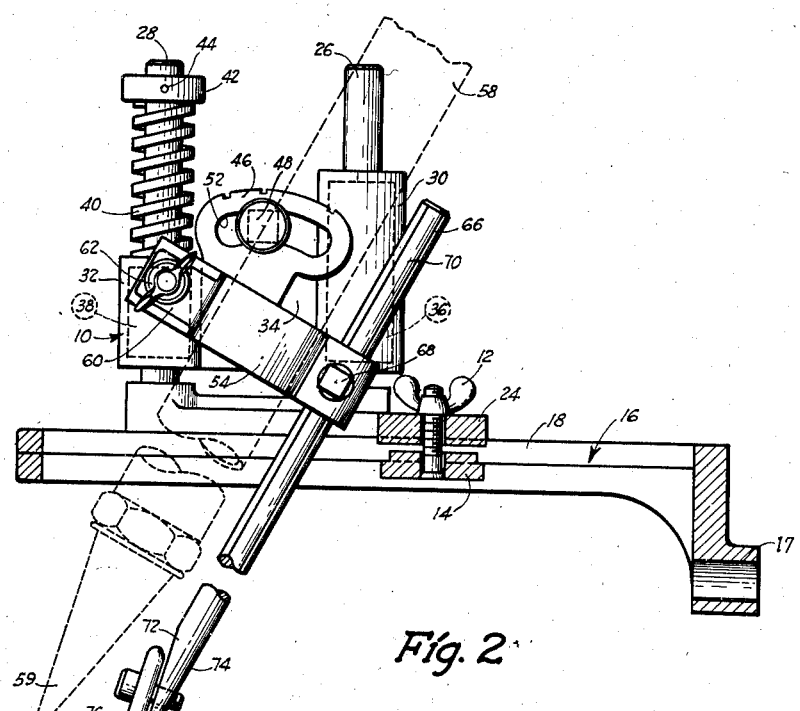
Fig. 2 is a sectional view taken on line 2—2 of Fig. 1 with portions shown in elevation, and depicting the cutting torch disposed therein in dotted lines adjacent a pipe.

The out of round attachment 10 comprises an angled plate member 24 which functions as a base for the attachment and cooperates with the wing nut 12 and plate 14 for adjustably securing the attachment 10 to the bracket member 16. A pair of spaced upstanding shaft or rod members 26 and 28 are provided on the plate member 24 for slidably receiving a pair of spaced sleeve members 30 and 32, respectively. The sleeve members 30 and 32 are rigidly spaced apart by means of a bracket or spacer member 34. A plurality of annular bearing members 36, preferably two in axial alignment, are provide within the sleeve member 30 and disposed around the shaft member 26 to provide for linear motion therebetween. A similar bearing member 38, preferably one but not limited thereto, is provided within the sleeve member 32 and around the shaft 28 to provide for linear motion therebetween. It will be noted that the sleeve member 32 is substantially half the length of the sleeve member 30 and is provided with a helical spring member 40 thereabove. The spring member 40 is disposed around the shaft member 28 and is anchored at one end within the sleeve member 32 and at the opposite end to an annular ring or collar member 42, which is suitably rigidly secured to the shaft 28 by means of a set screw 44, or the like. The spring member 40 constantly urges the spaced sleeve members 30 and 32 in a downward direction as viewed in Fig. 2. Vertical or linear movement of the sleeve members 30 and 32 on the shaft members 26 and 28, respectively, is facilitated by the bearing members 36 and 38. The double bearing feature within the sleeve member 30 substantially precludes any binding between the shafts 26 and 28 and the sleeves 30 and 32 during the vertical or reciprocal movement therebetween against the tension of the spring 40.

An index plate member 46 is adjustably secured to the bracket or spacer bar 34 in any suitable manner such as a bolt member 48 and nut 50, and a cooperating slotted portion 52. The slotted portion 52 is preferably of an arcuate configuration to provide for adjusting the angular disposition of the index plate 46 for a purpose as will be hereinafter set forth.

A torch clamp member 54 is rigidly secured to the index plate 46 in any suitable manner (not shown) and is adapted for movement simultaneously therewith. A substantially central bore 56 is provided in the clamp member 54 for receiving a suitable cutting torch 58 (shown in dotted lines in Fig. 2). A split flange member 60 extends radially outward from the bore 56 for cooperation with a suitable bolt member 62 for securely clamping the torch 58 within the bore 56. An off-set bore 64 is provided on the torch clamp 54 in substantial alignment with the central bore 56 for receiving an alignment rod member 66. The rod member 66 extends through the bore 64 and may be adjustably secured therein by means of a suitable set screw 68. The rod member 66 is preferably provided with a flat milled surface 70 to assure a proper alignment of the rod within the bore 64 for a purpose as will be hereinafter set forth.

A tapered or angled portion 72 is provided on the lower portion 74 of the shaft 66 for receiving an indicating roller member 76. The tapered portion 72 provides an angled disposition of the wheel 76 with respect to the shaft, and has the effect of keeping a firm bearing contact of the indicator roller 76 with the pipe 23 at all times, regardless of the disposition of the shaft 66. This feature substantially precludes the roller member from walking off during travel around the pipe 23, or from going off in some position other than a straight path around the pipe.

When the wheel moves circumferentially around the pipe 23, it will be apparent that any distortions on the outer periphery of the pipe 23 will be transmitted to the rod 66 through the bearing contact of the wheel 76 thereby causing a lowering or raising of the rod 66 or radial movement with respect to the pipe 23, depending upon the contour of the distortion. Any change in the position of the rod 66 with respect to the pipe 23 will be simultaneously transmitted to the torch 58 through the torch clamp member 54. Thus, the torch member 58 will be maintained at the same distance from the pipe 23 at all times during the cutting operation. Any movement of the torch clamp 54 will be transmitted to the spaced sleeve members 30 and 32 through the connection between the index plate 46 and the bracket member 34. Thus, an upward deflection will move the sleeve members 30 and 32 upward against the action of the spring 40. The spring 40, however, constantly urges the sleeve members 30 and 32 downward, as viewed in Fig. 2, for assuring a constant contact of the wheel 76 adjacent the outer periphery of the pipe 23.

OPERATION

The torch arm member 16 is preferably bolted, or the like, to the ring gear member (not shown) of a pipe cutting apparatus and extends longitudinally outward therefrom in alignment with the longitudinal axis of the pipe. Rotation of the ring gear transmits movement to the torch arm 16 for moving the arm circumferentially around the pipe 23 during the cutting operation. It will be apparent that the arm member 16 extends outwardly from the pipe cutting apparatus substantially parallel to the axis of the pipe 23, and will be radially spaced therefrom an equal distance during the entire circumferential movement of the bracket 16 around the pipe 23.

The cutting torch 58 may be disposed within the bore 56, and clamped securely therein by the cooperating bolt member 62 and split flange 60. The torch 58 may be disposed with the cutting end 59 at substantially any desired distance from the outer periphery of the pipe 23 for an efficient cutting of the pipe. The index arm member 46 may be disposed at any desired angle for positioning the torch 58 at substantially any angle with respect to the axis or outer periphery of the pipe 23. The angular disposition of the torch 58 will determine the angle of the bevel of the cut around the pipe 23 as is well known in the industry. As hereinbefore set forth, the index plate may be securely locked in position by means of the bolt member 48.

The rod member 66 may be disposed within the bore 64 of the torch clamp member 54. It is preferable to position the rod 66 in such a manner that the flat surface 70 is in alignment with the set screw 68 in order to properly position the roller member 76 with respect to the ring gear (not shown). This assures that the travel of the wheel 76 around the outer periphery of the pipe 23 will be in a plane parallel to the plane of the ring gear. Thus the indicator roller 76 will not cock or distort itself, or go off in some position other than a straight path around the pipe, regardless of the angular disposition of the rod 66 with respect to the axis of the pipe 23.

The wheel 76 is disposed adjacent the outer periphery of the pipe 23 and constantly bears thereagainst during the travel of the arm member 16 around the pipe. This contact between the wheel 76 and the outer periphery of the pipe 23 maintains the cutting end 59 of the torch member 58 an equal distance from the pipe at all times during the cutting operation. Any deviation from a true roundness on the outer periphery of the pipe will cause the roller member 76 to move vertically with respect to the arm member 16 and the upstanding shaft members 26 and 28. The vertical deviation of the wheel member 76 is transmitted simultaneously to the torch 58 through the rod member 66 and the torch clamp member 54, thereby maintaining the torch 58 an equal distance from the periphery of the pipe 23 even at points wherein the pipe is out of round, or distorted. The vertical movement of the torch 58 is transmitted to the sleeve members 30 and 32 by means of the index arm 46 which is rigidly secured to the spacer bracket 34. The sleeve members 30 and 32 will thus be reciprocated on the shaft members 26 and 28, thereby permitting a vertical movement of the torch 58 and wheel 76 with respect to the arm member 16.

As hereinbefore set forth, the spring member 40 constantly urges the sleeve members 30 and 32 downward as viewed in the drawings, or in a direction toward the pipe 23 at all times. This assures a firm bearing contact of the wheel 76 adjacent the outer periphery of the pipe during the cutting operation. The reciprocal movement of the sleeve members 30 and 32 with respect to the shafts 26 and 28 is facilitated by the bearing members 36 and 38. The double bearing feature within the sleeve 30 substantially precludes any binding between the shafts and the sleeve members during the relative linear movement therebetween.

In the cutting of the pipe 23, the arm member 16 is moved circumferentially around the pipe by the ring gear member of the cutting apparatus (not shown). The arm member 16 remains equidistant from the longitudinal axis of the pipe 23 at all times during its travel around the pipe, thereby tracing a circle therearound. The torch 58 is moved circumferentially around the pipe 23 simultaneously with the arm member 16. The indicator roller member 76 bearing against the outer periphery of the pipe 23 maintains the cutting element 59 an equal distance from the pipe at all times during the cutting operation. Any distortion on the periphery of the pipe 23 causes a vertical movement of the wheel 76 and torch 58, as viewed in the drawings, to maintain the torch cutting element 59 the same distance from the periphery of the pipe regardless of the distortion. It will be apparent, however, that the vertical shifting or movement of the torch 58 and indicating roller 76 in no manner alters the angular disposition of the torch 58, thereby maintaining an even and straight bevelled edge throughout the entire cut on the pipe. Thus, a straight cut with a constant bevelled edge may be provided for the pipe 23.

From the foregoing, it will be apparent that the present invention provides a novel out of round attachment for a pipe cutting apparatus. The novel attachment provides for the cutting of a straight and evenly bevelled cut around the circumference of the pipe, thereby substantially precluding the possibility of leaving jagged and uneven portions on the cut edge. The out of round device is simple and efficient in operation, and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an out of round attachment for use with a pipe cutting machine having a torch carrying arm member extending in alignment with the longitudinal axis of the pipe, said torch carrying arm having a pair of spaced arm members, a bracket adjustably secured to the arm members, a pair of spaced shaft members rigidly secured to the bracket member, a sleeve member slidably disposed on each of the shaft members, spring means cooperating with one of the shaft members and corresponding sleeve member for constantly urging the sleeve member in one direction, a clamp member adjustably secured to the sleeve members for receiving a cutting torch, said adjustability of said clamp member permitting varied angular dispositions of the torch with respect to the outer periphery of the pipe, an indicating roller member adjustably secured to the clamp means and positioned adjacent the outer periphery of the pipe, said roller responding to distortions in the pipe periphery for moving against the action of the spring means and maintaining the torch equidistant from the pipe, and said roller member and torch member disposed between the spaced arm members of the torch carrying arm member.

2. In an out of round attachment for use with a pipe cutting machine having a longitudinally extending torch arm in alignment with the longitudinal axis of the pipe, said torch arm having a pair of spaced arm members, a bracket adjustably secured to the arm members, a pair of spaced shaft members rigidly secured to the bracket member, a sleeve member slidably disposed on each of the shaft members, spring means cooperating with one of the shaft members and corresponding sleeve member for constantly urging the sleeve member in one direction, a clamp member secured to the sleeve members for receiving a cutting torch, an indicating roller member adjustably secured to the clamp means in alignment with the cutting torch and positioned adjacent the outer periphery of the pipe, said cutting torch and indicator roller member disposed between the spaced arm members of the torch arm and in alignment with the longitudinal axis of the pipe, and said roller responding to distortions in the pipe periphery for moving against the action of the spring means for maintaining the torch equidistant and equiangular with respect to the periphery of the pipe, said pair of spaced arm members precluding any binding of the shaft members during vertical movement against the tension of the spring members.

References Cited in the file of this patent

UNITED STATES PATENTS

| | | |
|---|---|---|
| 1,139,048 | Messer | May 11, 1915 |
| 1,529,954 | Irvin et al. | Mar. 17, 1925 |
| 1,705,923 | Irvin et al. | Mar. 19, 1929 |
| 2,061,442 | Summers | Nov. 17, 1936 |
| 2,687,880 | Waterson | Aug. 31, 1954 |

FOREIGN PATENTS

| | | |
|---|---|---|
| 201,483 | Germany | Sept. 11, 1908 |